United States Patent [19]

Tani et al.

[11] Patent Number: 4,692,025
[45] Date of Patent: Sep. 8, 1987

[54] SEMICONDUCTOR COLOR SENSOR DETECTION CIRCUIT

[75] Inventors: Zempei Tani, Tondabayashi; Yoshifumi Masuda, Tenri; Toshihide Miyake, Kashihara, all of Japan

[73] Assignee: Sharp Kabushiki Kaisha, Osaka, Japan

[21] Appl. No.: 734,341

[22] Filed: May 14, 1985

[30] Foreign Application Priority Data

May 30, 1984 [JP] Japan .................................. 59-112744
Nov. 8, 1984 [JP] Japan .................................. 59-236256

[51] Int. Cl.$^4$ .............................................. G01J 5/60
[52] U.S. Cl. ...................................... 356/45; 307/492; 328/145
[58] Field of Search .................... 356/45, 223; 328/145; 324/96, 140 D; 307/490, 491, 492, 494; 364/857

[56] References Cited

U.S. PATENT DOCUMENTS 4,309,604  1/1982  Yoshikawa et al. ................ 356/223

Primary Examiner—R. A. Rosenberger
Attorney, Agent, or Firm—Flehr, Hohbach, Test, Albritton & Herbert

[57] ABSTRACT

In a semiconductor color sensor circuit with two photodiodes having mutually different wavelength sensitivity characteristics, the ratio of numbers or areas of two types of transistors for logarithmic compression of signals from these photodiodes is adjusted so that errors in output voltage due to changes in temperature can be reduced and the dynamic range of illuminance of incident light can be enlarged.

8 Claims, 9 Drawing Figures

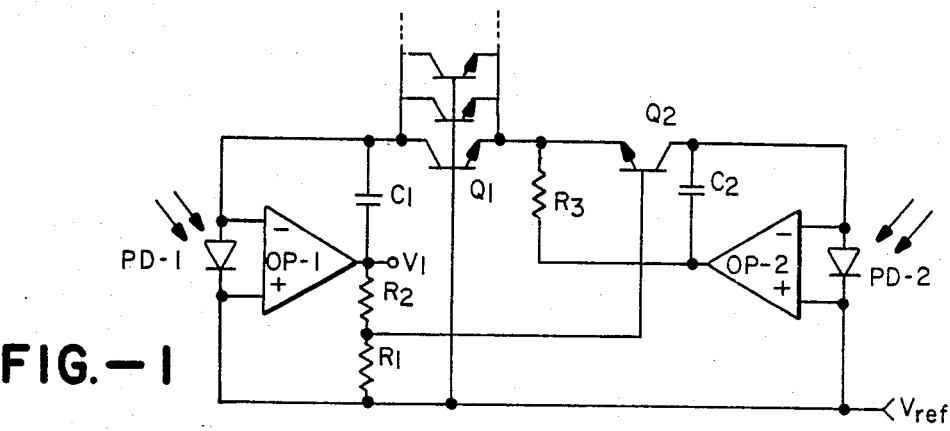
FIG.—1
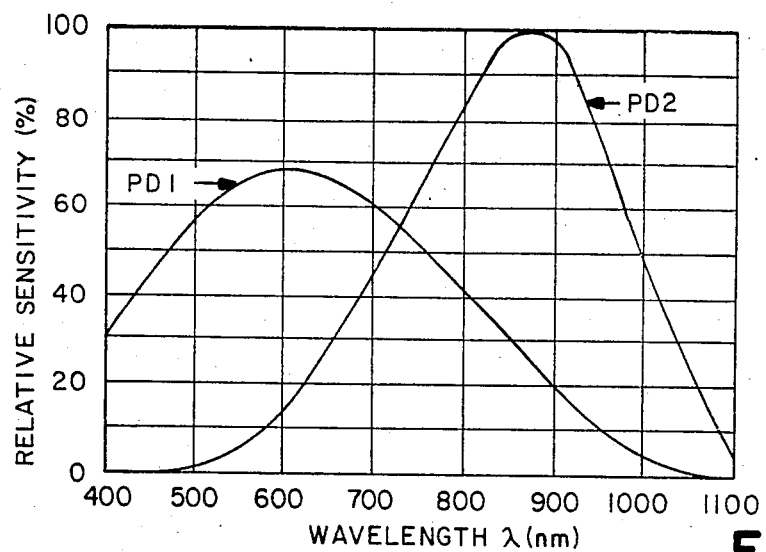
FIG.—2
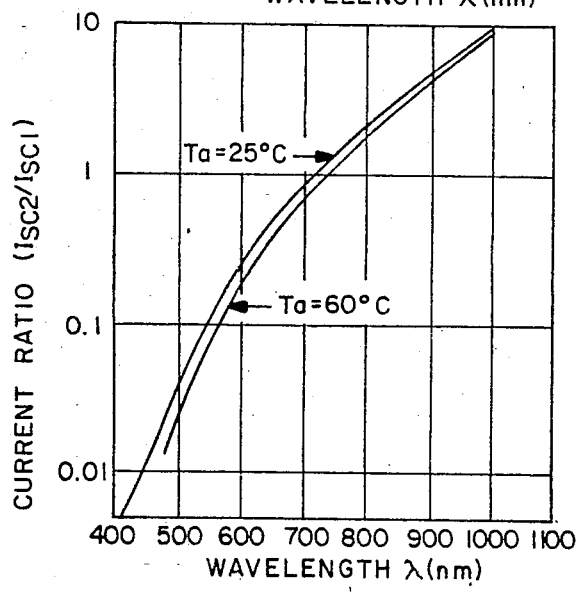
FIG.—3

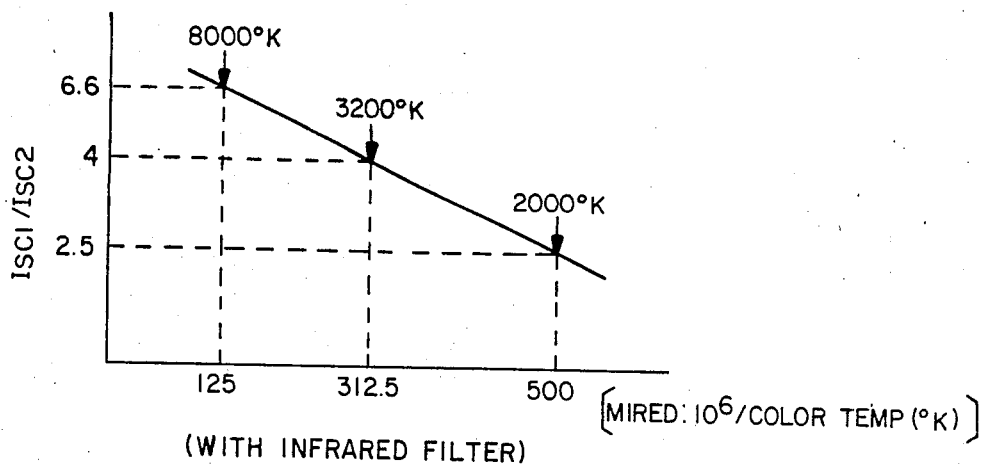
FIG.—4
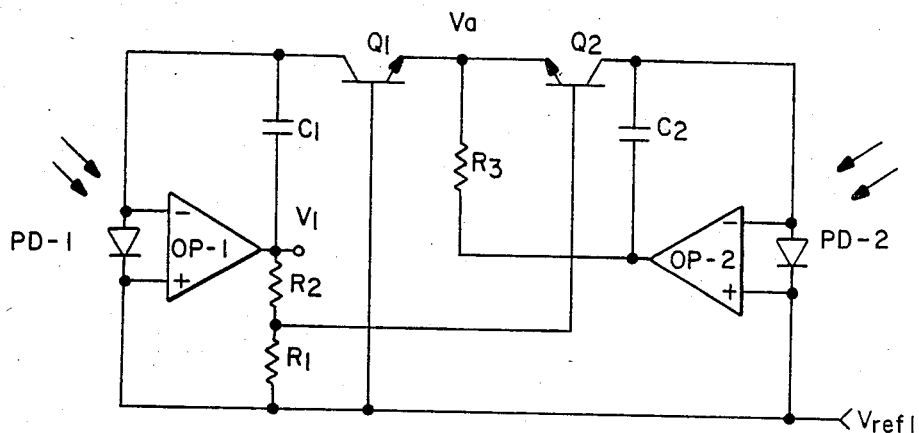
FIG.—5
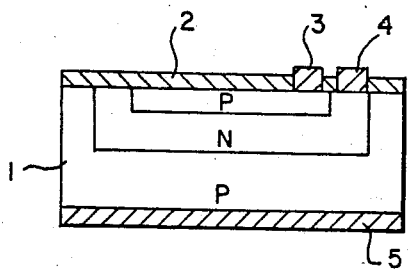
FIG.—6
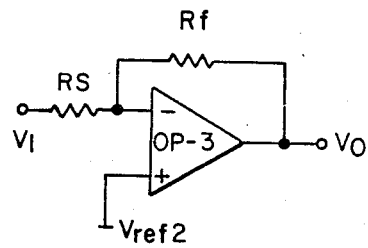
FIG.—7

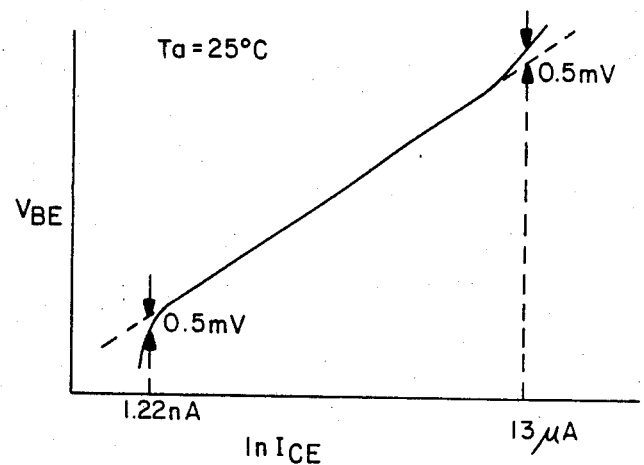
FIG. —8
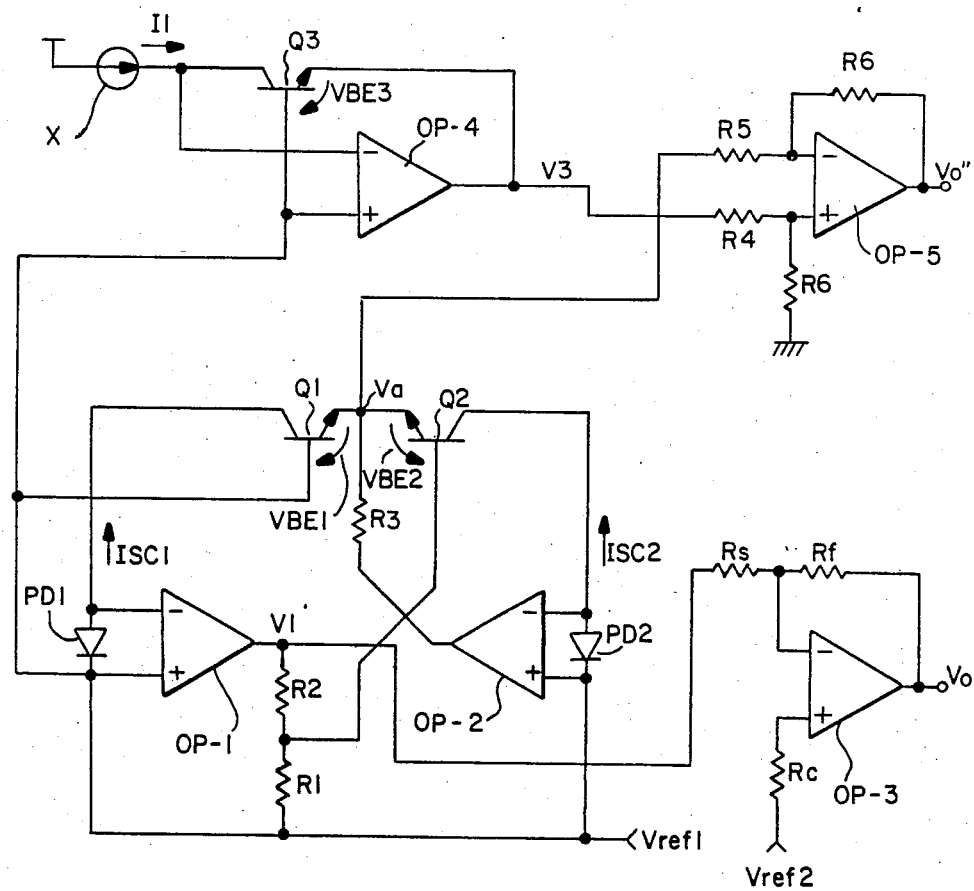
FIG. —9

SEMICONDUCTOR COLOR SENSOR DETECTION CIRCUIT

This invention relates to a circuit for detecting the color temperature or wavelength of a light source by using a color sensor and obtaining a corresponding output. It also relates to an apparatus for detecting color temperature provided with an output circuit for illuminance signals.

A color sensor having two photodiodes with different wavelength sensitivity characteristics on a single chip has been well known. If these photodiodes PD1 and PD2 have a maximum sensitivity respectively at a short wavelength and at a long wavelength as shown in FIG. 2, the relationship between the ratio of their short-circuit currents $I_{SC2}/I_{SC1}$ and the wavelength of incident light becomes as shown in FIG. 3. FIG. 4 shows the relationship between this short-circuit current ratio and color temperature. It is to be noted in FIG. 3 that there is a relationship of one-to-one correspondence between the short-circuit current ratio and wavelength independently of the illuminance of incident light so that one can measure wavelength by obtaining the short-circuit current ratio. It is also to be noted in FIGS. 3 and 4 that the logarithm of the short-circuit current ratio of these two photodiodes is proportional to the value of the incident wavelength and that of color temperature. There has therefore been a method of making use of these relationships, or the $I_C$-$V_{BE}$ characteristic of a transistor (or the $I_F$-$V_F$ characteristic of a diode) to output a signal proportional to the logarithm of the ratio of output currents from two photodiodes by first logarithmically converting the output currents of these photodiodes and then obtaining the difference of these output signals.

A previously considered semiconductor color sensor detection circuit by this method is shown in FIG. 5 wherein PD-1 and PD-2 represent two photodiodes having mutually different wavelength sensitivity characteristics. They are structured as shown in FIG. 6 wherein numeral 1 is a silicon substrate upon which a p-layer, an n-layer and another p-layer are formed in this sequence. Numeral 2 indicates an insulative layer and numerals 3, 4 and 5 each indicate an electrode. Since light beams of short wavelengths are absorbed by this semiconductor color sensor near the front surface of silicon while light beams of long wavelengths are absorbed in deeper regions, the photodiode PD-1 by the shallower pn junction has greater short-wavelength sensitivity while the photodiode PD-2 by the deeper pn junction has greater long-wavelength sensitivity.

In FIG. 5, $Q_1$ and $Q_2$ are transistors (or diodes) for logarithmic compression, OP-1 and OP-2 are amplifiers, $R_1$, $R_2$ and $R_3$ are resistors, and $C_1$ and $C_2$ are capacitors. If the base-emitter voltages of $Q_1$ and $Q_2$ are denoted respectively by $V_{BE1}$ and $V_{BE2}$, the saturation currents in reverse directions respectively by $I_{O1}$ and $I_{O2}$, and the currents generated from the photodiodes PD-1 and PD-2 respectively by $I_{SC1}$ and $I_{SC2}$, $$I_{SC1} = I_{O1}[\exp(qV_{BE1}/KT) - 1] \simeq I_{O1} \exp(qV_{BE1}/KT)$$

$$I_{SC2} = I_{O2}[\exp(qV_{BE2}/KT) - 1] \simeq I_{O2} \exp(qV_{BE2}/KT)$$

where q is the electronic charge, K is the Boltzmann constant and T is the absolute temperature.

Regarding the amplifier OP-1, $$V_a = V_{ref1} - (KT/q) \ln(I_{SC1}/I_{O1}).$$

Regarding the amplifier OP-2, $$V_a = [R_1(V_1 - V_{ref1})/(R_1 + R_2) + V_{ref1}] - (KT/q) \ln(I_{SC2}/I_{O2}).$$

When $I_{O1} = I_{O2}$, one obtains from the above, $$V_1 = -\frac{R_1 + R_2}{R_1} \cdot \frac{KT}{q} \ln \frac{I_{SC1}}{I_{SC2}} + V_{ref1}$$

If the output voltage $V_1$ of FIG. 5 is inputted to the amplifier OP-3 shown in FIG. 7, the output voltage $V_O$ from this amplifier OP-3 is $$V_O = -(V_1 - V_{ref2})R_f/R_S + V_{ref2} \quad \text{Eq. (1)}$$

$$= \frac{R_f}{R_S} \cdot \frac{R_1 + R_2}{R_1} \cdot \frac{KT}{q} \ln \frac{I_{SC1}}{I_{SC2}} +$$

$$\left(\frac{R_f}{R_S} + 1\right) V_{ref2} - \frac{R_f}{R_S} V_{ref1}.$$

One of the problems with the conventional semiconductor color sensor detection circuit described above relates to its temperature characteristics. In order to explain this problem, let F represent the first term in Eq. (1), or $$F = \frac{R_f}{R_S} \cdot \frac{R_1 + R_2}{R_1} \cdot \frac{KT}{q} \ln \frac{I_{SC1}}{I_{SC2}}.$$

Let us now assume that the ambient temperature changes in a range between $-20°$ C. and $60°$ C. while a color temperature of $3200°$ K. is being detected. If $R_f/R_S = 4.64$, $(R_1+R_2)/R_1 = 10$, $KT/q = 25.6$ mV (at $25°$ C.) and $I_{SC1}/I_{SC2} = 4.0$, the variation in output due to the term F is from $-22.30$ to $32.83$ mV. If we further assume that the output voltage is 1.8 V when a color temperature of $3200°$ K. is being detected, the aforementioned variation in output causes a significantly large error of from $-1.2\%$ to $2.0\%$.

Another problem with the conventional semiconductor color sensor detection circuit described above relates to the range of the illuminance of incident light. Although the output currents $I_{SC1}$ and $I_{SC2}$ respectively from the photodiodes PD-1 and PD-2 are proportional to the illuminance of incident light, their ratio $I_{SC1}/I_{SC2}$ takes the same value even if the illuminance of incident light changes, provided that their wavelengths and color temperatures are the same. The allowed range of the illuminance of incident light (the dynamic range), therefore, is determined according to the linearity range of the $I_{CE}$-$V_{BE}$ characteristics of the transistors $Q_1$ and $Q_2$. The $I_{CE}$-$V_{BE}$ characteristic of a typical transistor used for a bipolar IC is shown in FIG. 8. If we define the linearity range by the deviation in $V_{BE}$ of less than 0.5 mV as shown in FIG. 8, the linearity range for the transistor of FIG. 8 is $I_{CE} = 1.22$ nA $- 13$ μA.

If we consider now the detection of incident light with color temperature $3200°$ K. (312.5 mired), the characteristic curve of FIG. 4 shows that the ratio of output currents $I_{SC1}/I_{SC2}$ from the photodiodes PD-1 and PD-2 is 4. In other words, the current $I_{SC1}$ through the transistor $Q_1$ is four times the current $I_{SC2}$ through the transistor $Q_2$. If we increase the illuminance of incident light while keeping its color temperature at 3200° K., a variation in the output sets in when the output current $I_{SC1}$ through the transistor $Q_1$ exceeds 13 μA. In other words, the upper limit of the dynamic range for the illuminance of incident light is determined by the output current $I_{SC1}$ through the transistor $Q_1$ and its value is 13 μA. This value, if converted to illuminance, corresponds to about 24,000 lux. If this semiconductor color sensor is installed in a VTR camera, a range of the illuminance of incident light about 5 lux—100,000 lux should be expected. This clearly shows that the conventional circuit of FIG. 5 is not satisfactory.

It is therefore an object of the present invention to provide a semiconductor color sensor detection circuit with improved temperature characteristics and an improved upper limit of the dynamic range of incident light.

FIG. 1 is a circuit diagram of a semiconductor color sensor circuit according to an embodiment of this invention.

FIG. 2 shows the relationships between spectorscopic sensitivity and incident wavelength of two photodiodes having mutually different wavelength sensitivity characterisitics.

FIG. 3 shows the relationships between the short-circuit current ratio and incident wavelength of the same two photodiodes.

FIG. 4 shows the relationships between the short-circuit current ratio and color temperature of the same two photodiodes.

FIG. 5 is a circuit diagram of a previously considered semiconductor color sensor circuit.

FIG. 6 is a side cross-sectional view of a photodiode.

FIG. 7 is a circuit diagram of a portion of a conventional semiconductor color sensor circuit.

FIG. 8 is a graph of $I_{CE}$-$V_{BE}$ characteristic of a transistor.

FIG. 9 is a circuit diagram of a color temperature detector of the present invention with an output terminal for illuminance signals.

A circuit diagram of semiconductor color sensor detection circuit according to the present invention is shown in FIG. 1 wherein like symbols indicate corresponding components described in FIG. 5. FIG. 1 is different from FIG. 5 in that a plurality (or M-number) of transistors $Q_1$ are connected in parallel.

The transistors $Q_1$ and $Q_2$ are assumed to have the same characteristics. This can be realized easily by using ICs.

With a circuit structured as shown in FIG. 1, the output voltage $V_O'$ corresponding to Eq. (1) is given by $$V_O' = \frac{R_f}{R_S} \cdot \frac{R_1 + R_2}{R_1} \cdot \frac{KT}{q} \ln \frac{I_{SC1}}{M \cdot I_{SC2}} + \left(\frac{R_f}{R_S} + 1\right) V_{ref2} - \frac{R_f}{R_S} V_{ref1}. \quad \text{Eq. (2)}$$

Let us now use Eq. (2) to examine the two problems discussed above regarding the conventional circuit of FIG. 5. As done before, let G represent the first term on the right-hand side of Eq. (2), that is, $$G = \frac{R_f}{R_S} \cdot \frac{R_1 + R_2}{R_1} \cdot \frac{KT}{q} \ln \frac{I_{SC1}}{M \cdot I_{SC2}}.$$

Firstly, let us consider the problem of the temperature characteristic of the circuit. If we asume, as done before, that the ambient temperature varies in the range between −20° C. and 60° C. while a color temperature of 3200° K. is being detected, and if we further assume M=4, the variation in output due to the term G becomes 0. This is because the short-circuit ratio $I_{SC1}/I_{SC2}$ of the photodiodes at color temperature of 3200° K. is 4 as shown in FIG. 4 so that the logarithm factor in G becomes 0. Thus, a parallel combination of transistors $Q_1$ can significantly improve the temperature characteristic of a semiconductor color sensor detection circuit if the color temperature is fixed. Similar improvements can be achieved by also connecting a plurality of transistors $Q_2$ in parallel, by changing the ratio of numbers of transistors $Q_1$ and $Q_2$ connected in parallel separately, or by increasing the ratio of areas of the transistors themselves.

Secondly, the problem of dynamic range of the illuminance of incident light will be examined for the case of detecting light with color temperature of 3200° K. (312.5 mired). Although the ratio $I_{SC1}/I_{SC2}$ is 4 according to the curve of FIG. 4, the current flowing through each of the transistors $Q_1$ and $Q_2$ is the same because there are four times as many transistors $Q_1$ as there are transistors $Q_2$. If the illuminance of incident light is increased while its color temperature is fixed at 3200° K., an output error variation occurs as stated before when the current through one of the transistors $Q_1$ or $Q_2$ reaches the value of 13 μA. The output current $I_{SC1}$ from the photodiode PD-1 at this critical moment is 4×13 μA=52 μA and this corresponds to the illuminance of about 100,000 lux, which is about four times as large as the upper limit of the dynamic range for the circuit of FIG. 5.

In the explanation given above, the color temperature of incident light was assumed to be 3200° K. If it varies in the range between 200° K. and 8000° K., for example, FIG. 4 should be used to determine the range in which the ratio of color sensor output current changes in order to choose the numbers of transistors $Q_1$ and $Q_2$ in an optimum ratio. When the numbers of transistors $Q_1$ and $Q_2$ connected in parallel are not equal, $V_O$ becomes different from $V_O'$ but they can be made equal by adjusting the values of $V_{ref1}$ and $V_{ref2}$.

In another aspect, the present invention relates to a color temperature detector with a signal processing circuit adapted to output accurate electric signals corresponding to light sources of all kinds such as the sun, fluorescent lamps and halogen lamps. The color temperature detector may be capable of detection in an illuminance range of about 5 lux to 100,000 lux. For illuminances of less than 5 lux, however, the short-circuit current of the photodiodes used for the color sensor becomes weaker than 1 nA. At high temperatures, furthermore, the effects of dark currents of the photodiodes, the bias currents of the amplifiers, the leak currents of the transistors, etc. become significant, causing errors in the output voltage and rendering the detection of color temperature impossible. When such a color temperature detector is used in the automatic white-balancing module of a video camera, in particular, accurate white-balancing becomes impossible when the illuminance of incident light is very low.

A color temperature detector with an illuminance signal output terminal embodying the present invention is shown in FIG. 9 wherein like symbols are used again to indicate the same components as shown in FIGS. 1 and 7. Thus, the color temperature detection circuit comprises photodiodes PD-1 and PD-2 respectively connected between the inversion and non-inversion terminals of amplifiers OP-1 and OP-2 with the inversion input terminals of the amplifiers OP-1 and OP-2 respectively connected to the collectors of the transistors $Q_1$ and $Q_2$. The non-inversion input terminal of the amplifier OP-1 is connected to the base of the transistor $Q_1$ while its output terminal is connected not only to the inversion input terminal of the amplifier OP-3 through the resistor $R_S$ but also to the terminal $V_{ref1}$ through the resistors $R_1$ and $R_2$. The junction between the resistors $R_1$ and $R_2$ is connected to the base of the transistor $Q_2$. The output terminal of the amplifier OP-2 is connected to the junction between the emitters of the transistors $Q_1$ and $Q_2$ through the resistor $R_3$. The non-inversion input terminals of the amplifiers OP-1 and OP-2 are both connected to the terminal $V_{ref1}$. The resistor $R_f$ is the return resister of the amplifier OP-3 and the terminal $V_{ref2}$ is connected to the non-inversion input terminal of the amplifier OP-3 through the resistor $R_C$.

The circuit of illuminance detecting section includes a fourth amplifier OP-4 and the terminal $V_{ref1}$ is connected both to the non-inversion input terminal of the amplifier OP-4 and to the base of a third transistor $Q_3$. The output terminal of a constant-current source X is connected to the inversion input terminal of the amplifier OP-4 and to the collector of the transistor $Q_3$. The output terminal of the amplifier OP-4 is connected to the non-inversion input terminal of a fifth amplifier OP-5 through a resistor $R_4$ and to the emitter of the transistor $Q_3$. The junction between the emitters of the transistors $Q_1$ and $Q_2$ is connected to the inversion input terminal of the amplifier OP-5 through another resister $R_5$. $R_6$ indicates a return resister. The output voltage $V_O$ is given by Eq. (1) as explained before.

Let us consider next the part of this circuit of FIG. 9 including the amplifiers OP-4 and OP-5 for amplifying the base-emitter voltage $V_{BE1}$. If the collector current supplied to the transistor $Q_3$ is $I_1$, the base-emitter voltage of the transistor $Q_3$ is $V_{BE3}$, the voltage on the output terminal of the amplifier OP-4 is $V_3$ and the output voltage of the amplifier OP-5 is $V_O''$, we have $$V_3 = V_{ref1} - V_{BE3}$$
$$= V_{ref1} - (KT/q)\ln(I_1/I_{02})$$

and $$V_0'' = (V_3 - V_a)R_6/R_5$$
$$= (R_6/R_5)(KT/q)\ln(I_{SC1}/I_1).$$

This shows that $V_O''$ changes s ln $(I_{SC1})$. ($R_5$ is assumed to be a resistor with positive temperature coefficient of 3300 ppm/°C. so as to make up for the temperature characteristic of KT/q.)

In summary, this color temperature detector with an output terminal for illuminance signals is adapted to monitor both color temperature signals and illuminance signals. If this is used with a video camera, for example, it is possible to automatically switch to a manual operation when the illuminance becomes so low that the output errors in color temperature signals are too large. This detector has a further advantage of obviating the need for a separate photosensitive element to be installed in an automatical white-balancing module for measuring illuminance.

What is claimed is:

1. A semiconductor color sensor circuit comprising two photodiodes having mutually different wavelength sensitivity characteristics and two types of transistors for logarithmic compression of signals from said photodiodes, said two type of transistors being so adjusted that the current densities therethrough are nearly equal to each other at a certain color temperature between 2000° K. and 8000° K.

2. The circuit of claim 1 wherein said two types of transistors are adjusted by numbers thereof.

3. The circuit of claim 1 wherein said two types of transistors are adjusted by areas thereof.

4. A color temperature detector comprising a color sensor and a circuit adapted to output a signal proportional to the illuminance of incident light, said circuit including two photodiodes having mutually different wavelength sensitivity characteristics and two types of transistors for logarithmic compression of signals from said photodiodes, said two types of transistors being so adjusted that the current densities therethrough are nearly equal to each other at a certain color temperature between 2000° K. and 8000° K.

5. A semiconductor color sensor circuit comprising two photodiodes having mutually different wavelength sensitivity characteristics and two types of diodes for logarithmic compression of signals from said photodiodes, said two types of diodes being so adjusted that the current densities therethrough are nearly equal to each other at a certain color temperature between 2000° K. and 8000° K.

6. The circuit of claim 5 wherein said two types of diodes are adjusted by numbers thereof.

7. The circuit of claim 5 wherein said two types of diodes are adjusted by areas thereof.

8. A color temperature detector comprising a color sensor and a circuit adapted to output a signal proportional to the illuminance of instant light, said circuit including two photodiodes having mutually different wavelength sensitivity characteristics and two types of diodes for logarithmic compression of signals from said photodiodes, said two types of diodes being so adjusted that the current densities therethrough are nearly equal to each other at a certain color temperature between 2000° K. and 8000° K.

* * * * *